March 3, 1959  J. E. POORMAN  2,875,629
ADJUSTABLE OFF-CENTER DRILL HOLDER
Filed March 19, 1956  2 Sheets-Sheet 1
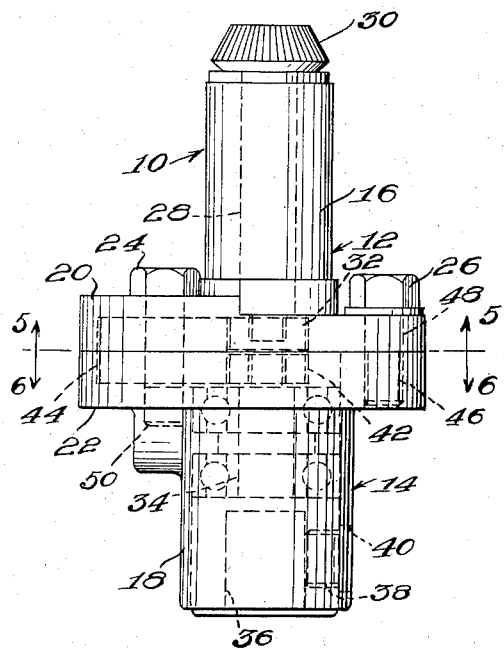
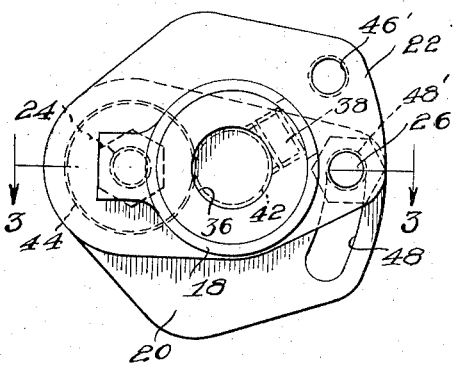
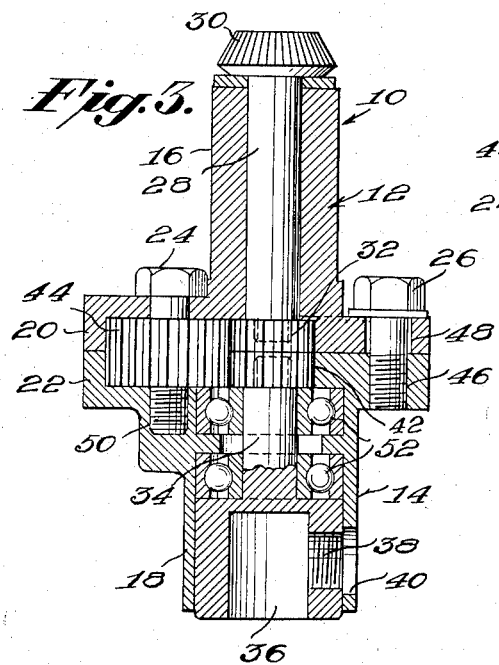
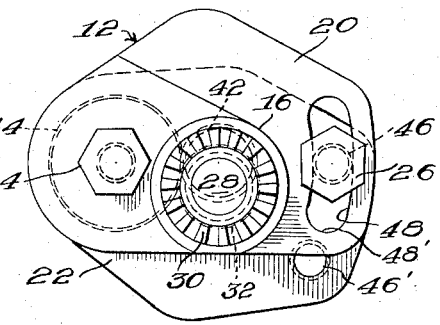
INVENTOR
John E. Poorman
BY
ATTORNEY March 3, 1959 J. E. POORMAN 2,875,629
ADJUSTABLE OFF-CENTER DRILL HOLDER
Filed March 19, 1956 2 Sheets-Sheet 2
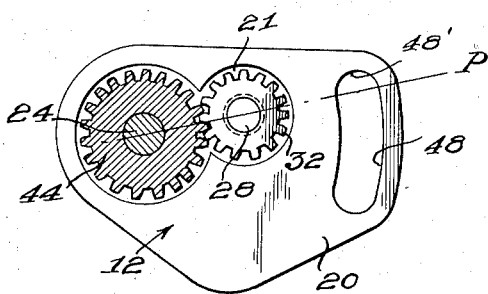
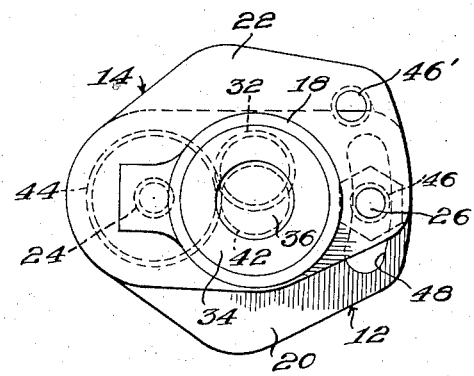
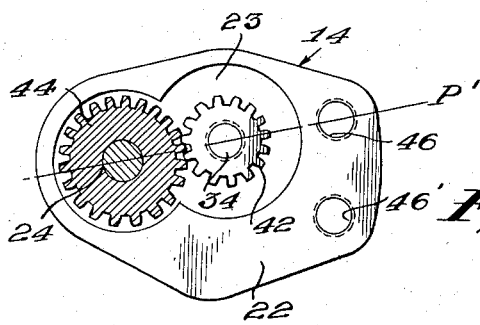
INVENTOR
John E. Poorman
BY
ATTORNEY

United States Patent Office 2,875,629
Patented Mar. 3, 1959

2,875,629

ADJUSTABLE OFF-CENTER DRILL HOLDER

John E. Poorman, Philadelphia, Pa., assignor to J. E. Poorman, Inc., Philadelphia, Pa.

Application March 19, 1956, Serial No. 572,285

1 Claim. (Cl. 74—384)

This invention relates to tool holders and more particularly to drill holders especially adapted for mounting in turrets of drill presses.

In the usual drill holder for use with turrets of drill presses, the holder comprises a housing having a shank adapted for mounting in the chuck in the turret and journalling a shaft having a drive element such as a bevelled gear at one end and a socket chuck for receiving a tool, such as a drill, at the other end. These holders support the drills in on-center positions only. It is frequently desirable, however, to drill holes in off-center positions and this involves a great deal of adjustment of the drill press or like machine or the work holder or both which is time consuming and often results in inaccurate work.

Having in mind the defects of the prior art devices, it is the principal object of the present invention to provide a drill holder adapted for adjustably supporting a drill or like tool.

It is another object of the invention to provide a drill holder capable of adjustment between the drive portion and the drill chuck portion for positioning the drill off-center with respect to the drive portion.

It is a further object of the invention to provide an adjustable on-off-center drill holder for mounting in turrets of drill presses.

It is a still further object of the invention to provide an adjustable on-off-center drill holder having simplicity of design, economy of construction and efficiency in operation.

Briefly, a drill holder in accordance with the present invention comprises a two-part housing pivotally connected at one side with a spindle journaled in each part of the housing on axes parallel to and equidistant from the pivot connection axis. Each of said spindles carrying a like gear at their adjacent ends and a single gear common to and in mesh with both spindle gears is journaled on the pivot connecting the two parts of the housing. Suitable clamp means is provided between the two housing parts, preferably on the side opposite the pivot, for maintaining the parts in desired relation. By this construction, the two housing parts can be angularly adjusted to support their respective spindles either in coaxial relation or in off-center relation and regardless of the relative angular positions of the two housing parts, both spindle gears will be retained in mesh with the common gear and the drive maintained through the common gear on the housing pivot.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Fig. 1 is a side view in elevation of an adjustable drill holder in accordance with the present invention;

Fig. 2 is an end view in elevation of the drill holding end of the holder shown in Fig. 1;

Fig. 3 is a cross-sectional view corresponding to line 3—3 of Fig. 2;

Fig. 4 is an end view in elevation of the drive end of the holder shown in Fig. 1;

Fig. 5 is a cross-sectional view corresponding to line 5—5 of Fig. 1;

Fig. 6 is a cross-sectional view corresponding to line 6—6 of Fig. 1, and

Fig. 7 is an end view in elevation similar to Fig. 2 but showing the holder in different adjustment.

Referring to the drawings in detail, a drill holder in accordance with the present invention comprises a housing 10 composed of two parts 12 and 14, said parts having shank portions 16 and 18 and flange portions 20 and 22, respectively. The flange portions of the housing parts are pivotally connected in face-to-face relation on one side by a screw or bolt 24 threaded in a blind bore 50 in the part 14, and are clamped in a selected fixed relation by a screw or bolt 26, preferably through the side opposite the pivot bolt 24. The shank portion 16 of the housing part 12 is preferably cylindrical and adapted for mounting in a clamp or chuck of a drill press and especially in the turret of such a machine.

The housing part 12 journals a drive spindle 28 which is provided at the end of the shank 16 and exteriorly thereof with a drive element such as a bevelled gear 30 for driving engagement with the drive means of the drill press. The housing flanges 20 and 22 are provided with recesses 21 and 23, respectively, in their facing sides and within the recess 21 of the flange 20, a spur gear 32 is fixed on the spindle 28. A chuck spindle 34 is journaled in the housing part 14, preferably by axially spaced anti-friction bearings 52, and is provided at its outer end with a chuck socket 36 for the reception of a drill or like tool which is secured in the socket by a set screw 38 threaded within the spindle and available for adjustment through an aperture 40 in the shank 18.

At its inner end within the recess 23 of the flange 22, the chuck spindle 34 is provided with a spur gear 42 of the same size and toothing as the spur gear 32. An intermediate gear 44 is journaled on the pivot bolt 24, which joins the two housing parts, and this intermediate gear 44 is enclosed within the recesses 21 and 23 of both flanges 20 and 22 and is common to and in mesh with both spur gears 32 and 42. The axes of the two spindles 28 and 34 are parallel to and equispaced from the axes of the pivot bolt 24 so that the spur gears 32 and 42 remain in mesh with the intermediate gear 44 regardless of the relative angular position of the housing parts 12 and 14.

To accommodate angular adjustment of the two housing parts, one of the flanges, preferably the flange 22, is provided with a tapped bore 46 for threaded engagement by the clamp bolt 26 and the other of the flanges 20 is provided with an arcuate slot 48 curved on a radius from the axis of the pivot bolt 24, the spacing of the axis of the bore 46 from that of the bolt 24 being identical to the radius of the center of the slot 48. Moreover, the flange 22 is preferably provided with a second tapped bore 46' so that the clamp bolt 26 can be selectively threaded in either of the bores 46 or 46' depending upon the angular adjustment which is desired between the two housing parts.

As will be more apparent hereinafter, the bore 46 and slot 48 are provided with a predetermined relation with respect to the pivot bolt 24 and their respective spindles, as best shown in Figs. 5 and 6. Referring to Fig. 5, it will be seen that the axis of curvature of one end 48' of the slot 48 parallel to and in the same plane P with the axes of the spindle 28 and pivot bolt 24. Similarly, as shown in Fig. 6, the axis of the bore 46 is parallel to and in the plane P' with the axes of the spindle 34 and bolt 24. Thus, when the clamp bolt 26 is nested in the end 48' of the slot 48, as shown in Fig. 2, the planes P and P' are coincident and the spindles 28 and 34 are coaxial so that the drill will be on-center.

In operation, the shank 16 of the housing part 12 is mounted in a suitable holder, clamp or chuck in a drill press with the drive gear 30 in mesh with the drive of the drill press. The desired drill or like tool is inserted in the socket 36 and clamped by the set screw 38, the chuck spindle 34 being rotated to expose the set screw 38 through the aperture 40 in the housing shank 18. The clamp bolt 26 is then loosened, and also the pivot bolt 24 if necessary, to permit angular adjustment between the housing parts 12 and 14 so as to position the axes of the drive spindle 28 and chuck spindle 34 in desired relationship. For example as shown in Fig. 2, the two spindles may be in on-center or axially aligned, the planes P and P' being coincident, in which event, the holder may function in the same manner as a usual holder.

Conversely, if an off-center relationship is desired, the two housing parts 12 and 14 may be angularly adjusted about the pivot bolt 24 so that the axes of the spindles 28 and 34 and their respective spur gears 32 and 42 are off-set relative to each other as shown in Figs. 4 and 7. In the event that the desired angular adjustment cannot be obtained due to the length of the slot 48, the clamp screw 26 can then be removed from the tapped bore 46 and inserted in the bore 46' to thereby enable additional adjustment between the housing parts. When the spindle axes are in the desired adjusted relation, the housing parts are then secured in fixed relation by tightening the clamp screw 26, and possibly the pivot screw 24, to secure the parts in these selected relations.

As will be readily evident, regardless of the angular relationship between the axes of the two spindles, the drive from the gear 30 through the spindle 28 will be transmitted by the spur gear 32 to the intermediate gear 44 which will in turn drive the spur gear 42 and the chuck spindle 34. Thus for drilling off-center holes, as for example a series of circularly arranged holes, both the drill and the work piece may be retained in fixed relation relative to the machine and the work piece or the drill, particularly if the drill holder is mounted in a turret, moved through a circular path so that the only adjustment necessary is the step-by-step movement of whichever part is moved.

Although a certain specific embodiment of the invention has been shown and described, it is obvious that many modifications thereof are possible. The invention, therefore, is not to be restricted except insofar as is necessitated by the prior art and by the spirit of the appended claim.

That which is claimed as new is:

A tool holder comprising a housing including two body parts having mutually abutting planar faces, a spindle journaled in each of said housing parts perpendicular to the planar face of its respective part, means on one of said spindles for driving said spindle, means on the other of said spindles for releasably holding a tool, means pivotally connecting said housing parts with their planar faces in abutting relation and with the pivot axis equally spaced from each of the axes of said spindles, a gear journaled on the pivot axis and enclosed between said body parts, a pair of duplicate gears respectively fixed on the adjacent ends of said spindles and both in mesh with said first mentioned gear, whereby said tool holding spindle is driven from said drive spindle regardless of the angular relation about said pivot of said body parts, one of said body parts having an arcuate slot on a radius from said pivot means, the other of said body parts having a bolt hole spaced from said pivot means a distance equal to the radius of said slot and registerable with said slot, and a bolt inserted through said slot and bolt hole and releasably clamping said body parts in selected relation on said pivot means, one end of said slot being semicircular, the axis of curvature of said end and the axis of said bolt hole both lying in a plane intersecting the axis of said pivot means and the axis of the respective spindle, whereby sliding said bolt into said end disposes said spindles positively in on-center axial alignment with the axis of the bolt, the axis of the pivot means and the axes of the respective spindles all lying in a single plane, rendering unnecessary the use of mechanical adjusting means.

References Cited in the file of this patent
UNITED STATES PATENTS 1,132,196   Lindner _____ Mar. 16, 1915